Feb. 12, 1952    R. FRIDDELL    2,585,000
APPARATUS FOR COOKING EDIBLE IMITATION, HOLLOW CORNCOBS
Filed April 22, 1947    3 Sheets-Sheet 2

Inventor
Roy Friddell
By *Clarence A. O'Brien and Harvey B. Jacobson*
Attorneys

Feb. 12, 1952 R. FRIDDELL 2,585,000
APPARATUS FOR COOKING EDIBLE IMITATION, HOLLOW CORNCOBS
Filed April 22, 1947 3 Sheets-Sheet 3
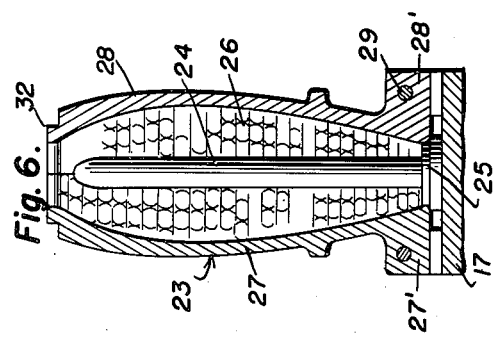
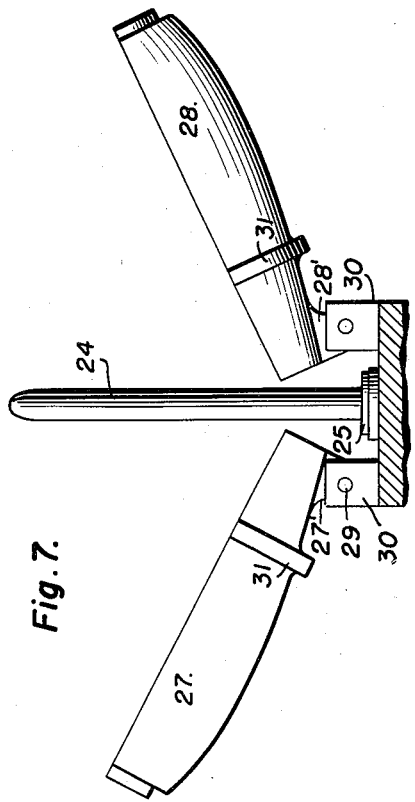
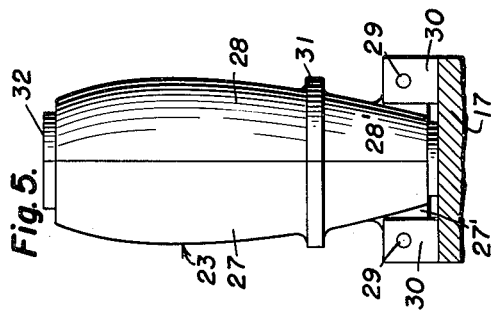
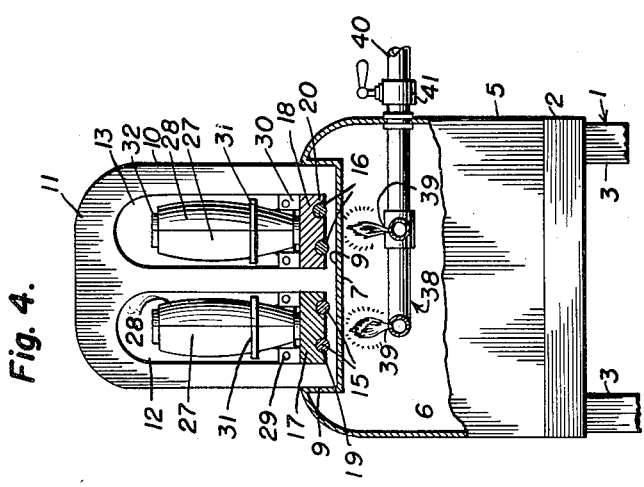
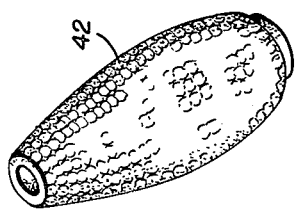
Inventor
Roy Friddell
By Clarence A. O'Brien
and Harvey B. Jacobson
Attorneys

Patented Feb. 12, 1952

2,585,000

UNITED STATES PATENT OFFICE 2,585,000

APPARATUS FOR COOKING EDIBLE IMITATION HOLLOW CORNCOBS

Roy Friddell, Galveston, Tex.

Application April 22, 1947, Serial No. 743,129

7 Claims. (Cl. 107—66)

My invention relates to improvements in apparatus for cooking edible, imitation, hollow corn cobs for use as containers for fillers of highly seasoned, chopped meat, or similar food to form a unique refreshment food novelty for dispensing at lunch counters, refreshment stands, and the like.

The primary object of my invention is to provide a practical, efficient apparatus for quickly cooking such containers in batches from batter in perfectly molded form and by means rendering removal of the cooked containers quick and easy without breaking or mutilating the same.

Another object is to provide apparatus of this character and for the purposes above set forth which is economical to operate, safe, easy to maintain clean and sanitary, and inexpensive to manufacture and install.

Other and subordinate objects, also comprehended by my invention, together with the precise nature of my improvements and the advantages thereof will be readily understood when the succeeding description and claims are read with reference to the drawings accompanying and forming part of this specification.

In said drawings:

Figure 4 is a view in vertical transverse section taken on the line 4—4 of Figure 3;

Figure 5 is a detail fragmentary view drawn to a larger scale and illustrating in front elevation one of the molds closed, and the mold carriage in cross section;

Figure 6 is a similar view in vertical section;

Figure 7 is a view similar to Figure 5 but showing the mold open; and

Figure 8 is a view in perspective of the cooked container.

Figure 1:
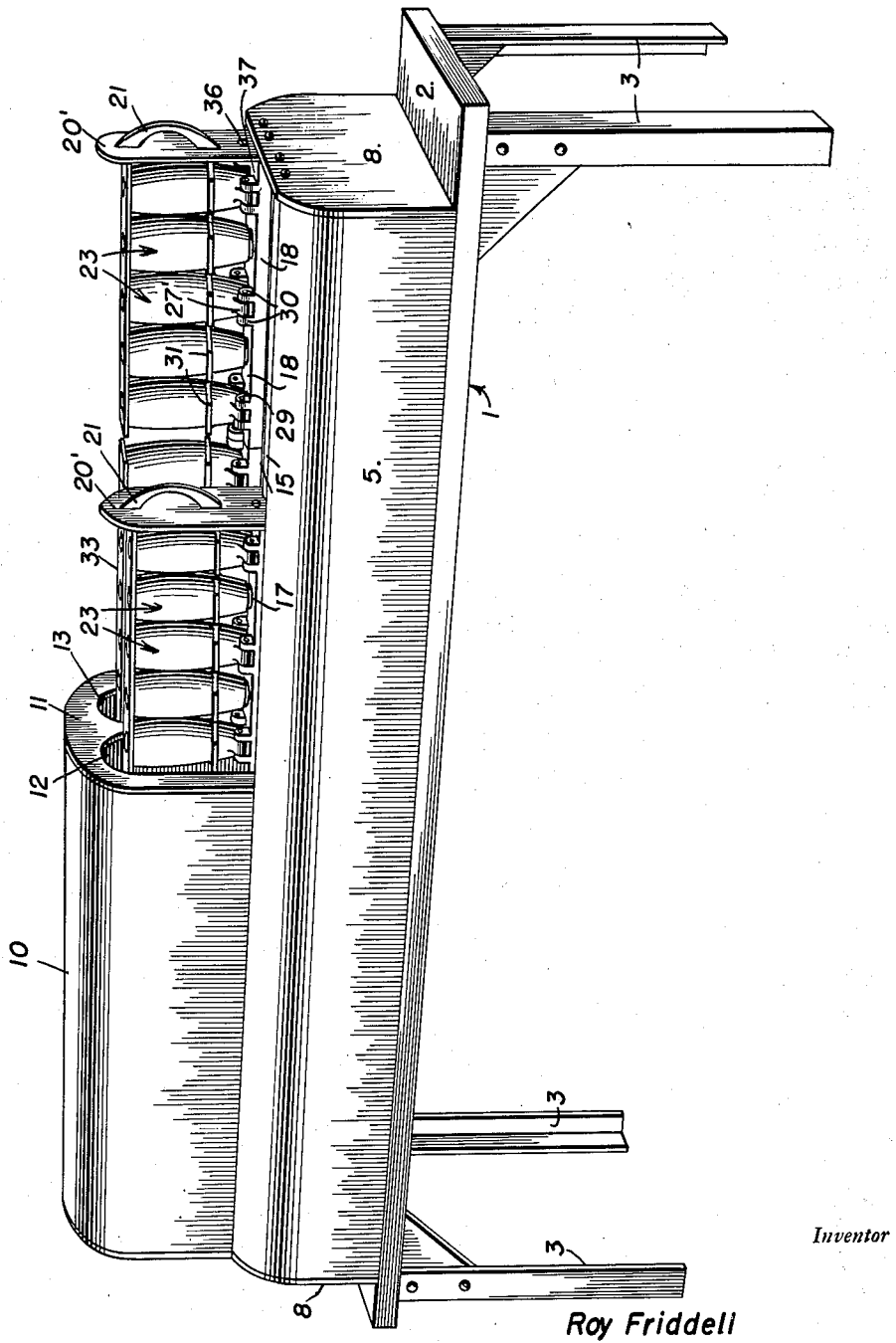
Figure 1 is a view in perspective of my improved apparatus in a preferred embodiment thereof.

Referring to the drawings by numerals, my improved cooking apparatus, in the illustrated preferred embodiment thereof, comprises a suitably elongated base which may take the form of a table 1 including a top 2 and corner legs 3. The table 1 may be formed of any suitable material, the top 2 being preferably of sheet iron, or aluminum.

Surmounting the table top 2 is an elongated longitudinally extending casing 5 which may be of any desired length and which is closed, with the exceptions presently noted, and suitably secured on said top 2. The casing 5 is formed of any suitable material and provides therein an elongated combustion chamber 6. Suitable air inlet apertures, for combustion purposes, and a vent opening for products of combustion may be provided in the casing 5, but it has not been deemed necessary to illustrate the same. The top 7 of the casing 5, between the ends 8 thereof, is formed with a longitudinal, flat bottomed, and straight sided channel 9 therein of uniform width, the purpose of which shall presently appear.

An elongated oven forming casing 10, of hood like form and of any suitable material, and having an open bottom is fitted and suitably secured in the channel 9 to extend from one end 8 of the casing 5 partway along the top 7 of said casing with an entrance end 11 adjacent to the transverse center of said casing 5 and provided with a pair of side by side, vertically elongated, door forming openings 12, 13 arranged upon opposite sides of the longitudinal center of said channel 9. The oven forming casing 10 and the top 7 of the casing 5 form an oven 14 which is closed with the exception of said openings 12, 13.

Pairs of laterally spaced guide rods 15, 16 extend in pairs through the openings 12, 13 and are provided in the channel 9 with the ends thereof suitably fixed in the ends 8 of said casing 5, said rods being spaced preferably above the bottom of the channel 9.

A pair of bar like mold carriages 17, 18 slidably fitting in the openings 12, 13 are removably mounted on the pairs of guide rods 15, 16 and for endwise sliding thereon into and out of the oven 14, by means of bottom grooves 19, 20 therein fitting over said pairs of guide rods 15, 16. The mold carriages 17, 18 are of substantially the same length as the oven 14 and are adapted to be slidably withdrawn completely out of the same.

Upright end plates 20' on said mold carriages 17, 18 with hand grips 21 thereon are adapted to abut one end 8 of the casing 5 when said carriages 17, 18 are completely withdrawn from the oven 14 and thereby limits sliding movement of said carriages outwardly of said oven. The end plates 20' are adapted to form covers for closing the openings 12, 13 when the said carriages 17, 18 have slid completely into the oven 14.

A plurality of hollow, elongated molds 23 are provided in a row on each mold carriage 17, 18 to extend in upright position in a row along the carriages in equi-distantly spaced relation in two series on each carriage. The molds 23 are adapted to surround axial, rod like, cores 24 upstanding from stepped bases 25 on said carriages 17, 18. The molds 23 are of longitudinally bulging form externally and internally and are surfaced internally, as at 26, to simulate the exterior of the usual dried corn cob, and split longitudinally into half sections 27, 28. Diametrically opposite lug 27', 28' on the lower ends of the half sections 27, 28 of alternate molds 23 in each series are pivoted by pins 29 between pairs of upstanding side edge lugs 30 on said carriages 17, 18 whereby said pairs of sections 27, 28 may be swung outwardly and downwardly, laterally of said carriages 17, 18, from mold closing to mold opening position as shown in Figures 5 and 7 respectively. Reinforcing beads 31 formed on said half sections 27, 28 connect, in each series of molds 23, the half sections 27 on the one hand, and the half sections 28, on the other hand, for unitary swinging of said half sections. As shown in Figure 6, when the half sections 27, 28 of the molds 23 are swung into mold closing position, the lower ends thereof seat on the core bases 25 to close the lower ends of said molds 23. The upper ends of the molds 23 are open as best shown in Figure 6.

Means are provided for locking the pairs of mold sections 27, 28 in each series of molds in mold closing position and comprising the following. Annular flanges 32 surmount the upper ends of the molds 23 concentrically and are formed in the half sections on said mold sections 27, 28. Rectangular, elongated locking plates 33 are provided for removably seating on the upper ends of each series of molds 23 with longitudinally spaced apertures 34 therein fitting around the flanges 32 and holding the pairs of mold sections 27, 28 in mold closing position.

For convenience in cleaning, the mold carriages 17, 18 are divided transversely intermediate the series of molds 23 into sections with upstanding end lugs 34 bolted together, as at 35, for detachment of said sections. For the same purpose, the end plates 20' may be bolted, as at 36, to end lugs 37 on the mold carriages 17, 18 to be detached from said carriages.

A suitable gas burner 38 is provided in the combustion chambers 6 with two rows of jets extending longitudinally of said chamber beneath the oven 14, said burner being provided with a gas feed line 40 extending to one side of the casing 5 and provided with a gas control valve 41 therein.

Figure 2:
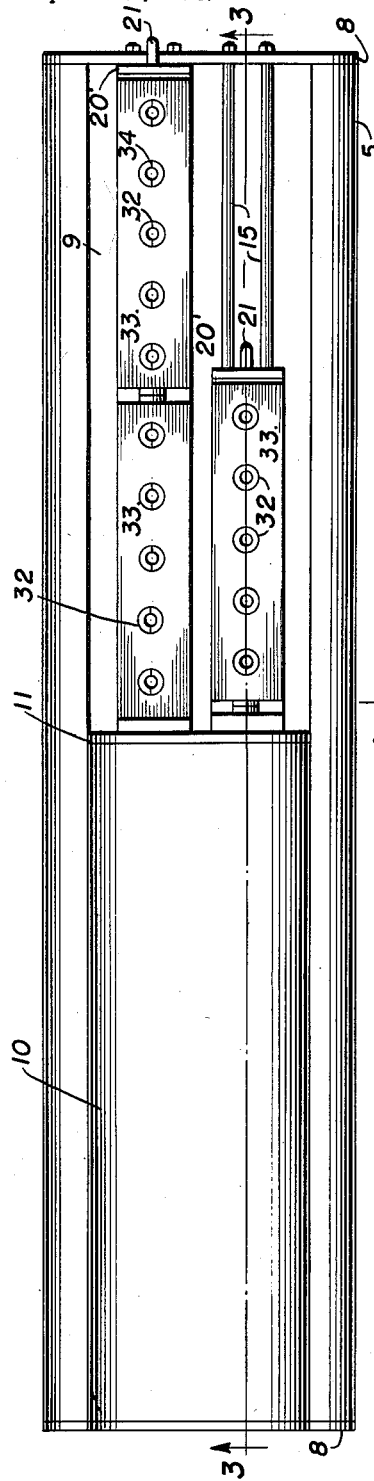
Figure 2 is a view in plan.
Figure 3:
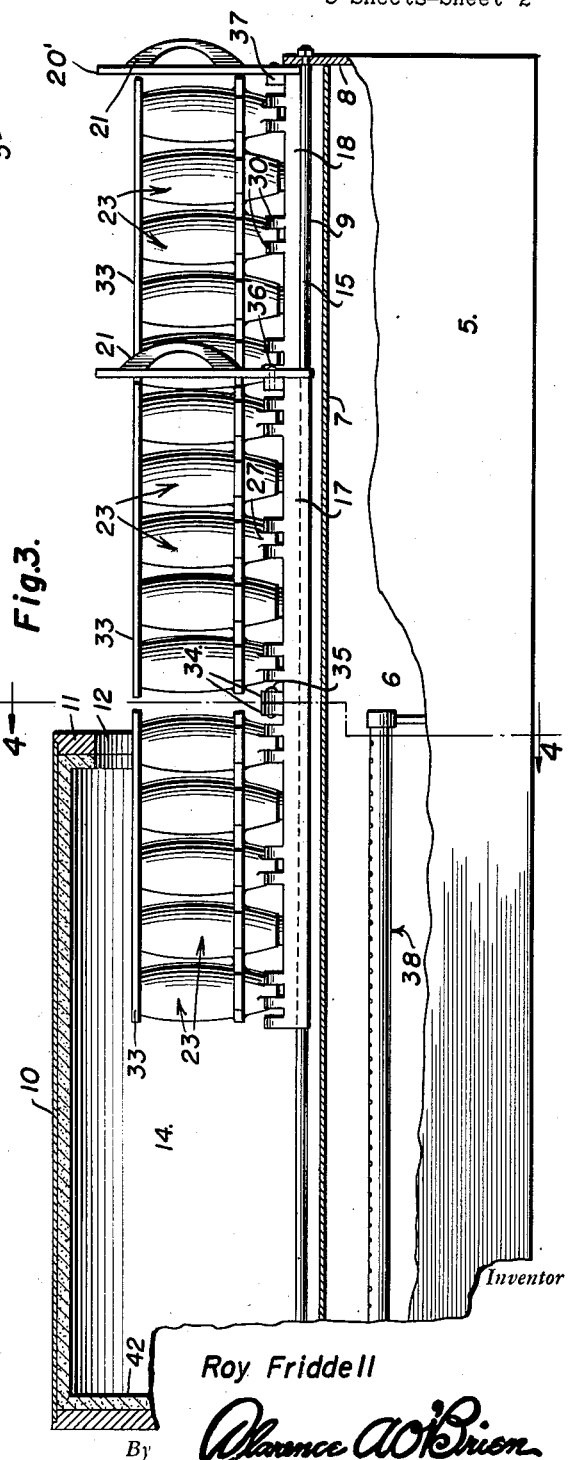
Figure 3 is a view partly in side elevation and partly in longitudinal section taken on the line 3—3 of Figure 2.

In using the described apparatus, the mold carriages 17, 18 are slid out of the oven 14 on the guide rods 15, 16 into fully withdrawn position, as shown in Figures 1, 2 and 3 in illustration of the mold carriages 18. The molds 23 are then filled with a suitable batter, not shown, through the upper ends thereof and one of said carriages, for instance 17, is slid into the oven 14 until the end plate 25 thereof covers the openings 12 and thereby closes the corresponding side of the oven 14. When the batter is cooked in the molds 23 on the mold carriage 17, as may be ascertained by timing, said carriage is withdrawn from the oven 14 and the other mold carriage 18 with the molds 23 filled is slid into said oven 14 in the same manner as described with reference to the mold carriage 17. While the batter in the molds 23 of said carriage 18 is cooking, the molds 23 on the withdrawn mold carriage 17 may be unlocked by removing the locking plates 33 after which the sections 27, 28 of the molds 23 may be swung into mold opening position and the contents of the molds removed by lifting the same off of the cores 24. As will be manifest, the cooked contents takes the form of hollow, corn cob like, edible containers 42, as shown in Figure 8, with both ends open. The described operation may be repeated to alternately cook one batch of said containers 42 while another cooked batch is being unloaded from the molds 23. As will be apparent, the molds 23 and contents thereof and the withdrawn mold carriage 17, 18, as the case may be, are kept warm by the combustion chamber 6 until unloaded because the top 7 of said casing 5, outwardly of the entrance end 11 of the oven forming casing 10, forms an exposed warming table. The described containers 46 may be stuffed with any desired filler, such as highly seasoned cooked hamburger, spiced ground meat, and other similar fillers, and served hot, or cold, as unique refreshment or food novelties. Any suitable liner 42 may be provided in the oven 14.

The foregoing will, it is believed, suffice to impart a clear understanding of my invention, without further explanation.

Manifestly, the invention, as described, is susceptible of modifications without departing from the inventive concept, and right is herein reserved to such modifications as fall within the scope of the appended claims.

What I claim is:

1. In apparatus of the class described, an elongated casing forming a combustion chamber having a closed top, an elongated oven on said top extending from one end of said casing partway along said top with an entrance end disposed intermediate the ends of said casing, said top of the combustion chamber forming outwardly of said entrance end of the oven an exposed warming table, an elongated mold carriage, means slidably mounting said carriage on said top of the combustion chamber for manual movement endwise off said table into said oven, a longitudinal row of upright molds on said carriage adapted to contain batter for cooking in said oven when the carriage is moved into the same and to be maintained warm when said carriage is moved onto said warming table, and means for generating heat in said casing beneath said oven.

2. In apparatus of the class described, an elongated casing forming a combustion chamber having a closed top, an elongated oven on said top extending from one end of said casing partway along said top with an entrance end disposed intermediate the ends of said casing, said top of the combustion chamber forming outwardly of said entrance end of the oven an exposed warming table, an elongated carriage, means slidably mounting said carriage on said top of the combustion chamber for manual movement endwise off said table into said oven, and a longitudinal row of upright molds on said carriage adapted to contain batter for cooking in said oven when said carriage is moved into the same and to be maintained warm when said carriage is moved onto said warming table, said molds comprising complemental half sections hinged on said carriages for swinging relatively into mold opening and closing positions, and an apertured plate detachably fitted around the tops of the molds in said row for maintaining the complemental half sections in mold closing position.

3. In apparatus of the class described, an elongated casing forming a combustion chamber having a closed top, an elongated oven on said top extending from one end of said casing partway along said top with an entrance end disposed intermediate the ends of said casing, said top of the combustion chamber forming outwardly of said entrance end of the oven an exposed warming table, an elongated carriage, means slidably mounting said carriage on said top of the combustion chamber for manual movement endwise off said table into said oven, and a longitudinal row of upright molds on said carriage adapted to contain batter for cooking in said oven when said carriage is moved onto said warming table, said molds comprising complemental half sections hinged on said carriage for swinging relatively into mold opening and closing positions, the half sections being connected together in said row of molds in complemental series for swinging in unison into mold opening and closing positions in the series, and an apertured plate detachably fitted around the tops of the complemental series of half sections to maintain the same in mold closing position.

4. In apparatus of the class described, an elongated oven with an entrance end, an elongated mold carriage, means slidably mounting said carriage for manual movement endwise into and out of said oven, a longitudinal row of upright molds on said carriage comprising complemental half sections hinged to said carriage for swinging relatively into mold opening and closing positions, and a plate detachably fitting around the tops of said half sections to maintain the same in mold closing position in series in the row.

5. In apparatus of the class described, an elongated casing forming a combustion chamber and provided with a top embodying a longitudinal channel therein closed at the ends of the casing, an elongated oven on said top extending from one end of the casing partway along said top with an entrance end disposed intermediate the ends of said casing, said top outwardly of said entrance end forming an exposed warming table, guide rods in said channel extending parallel from end to end thereof with opposite ends fixed in the ends of the casing, an elongated mold carriage with longitudinal bottom grooves fitting over said rods whereby said carriage is removably and slidably mounted on said rods and in said channel for movement endwise of said warming table into said oven, and a longitudinal row of molds on said carriage for containing batter for cooking in said oven when the carriage is moved into the same and to be maintained warm by said warming table when said carriage is moved out of said oven.

6. In apparatus of the class described, an elongated casing forming a combustion chamber having a closed top, an elongated oven on said top extending from one end of said casing partway along said top with an entrance end disposed intermediate the ends of said casing, said top of the combustion chamber forming outwardly of said entrance opening an exposed warming table, an elongated carriage, means slidably mounting said carriage on said top of the combustion chamber for manual movement endwise from over said table into said oven, a longitudinal row of upright molds on said carriage adapted to contain batter for cooking in said oven when said carriage is moved into the same and to be maintained warm when said carriage is moved over said warming table, and means for generating heat in said casing.

7. Apparatus according to claim 6 wherein said first named means comprises a longitudinal channel in said top, longitudinal parallel guide rods in said channel having the ends thereof fixed in the ends of said casing, said carriage having bottom longitudinal grooves slidably fitting over said rods and whereby said carriage is removable off said rods when over said table.

ROY FRIDDELL.

REFERENCES CITED

The following references are of record in the file of this patent:

UNITED STATES PATENTS

| Number | Name | Date |
|---|---|---|
| 1,097,576 | Winder | May 19, 1914 |

FOREIGN PATENTS

| Number | Country | Date |
|---|---|---|
| 11,848 | Great Britain | June 1, 1908 |